C. W. SALADEE.
CURRY-COMB.

No. 177,013. Patented May 2, 1876.

WITNESSES: INVENTOR:

UNITED STATES PATENT OFFICE.

CYRUS W. SALADEE, OF WASHINGTON, DISTRICT OF COLUMBIA, ASSIGNOR TO CHARLES E. L. HOLMES, OF NEW YORK, N. Y.

IMPROVEMENT IN CURRY-COMBS.

Specification forming part of Letters Patent No. 177,013, dated May 2, 1876; application filed February 28, 1876.

*To all whom it may concern:*

Be it known that I, CYRUS W. SALADEE, of Washington city, in the District of Columbia, have invented certain Improvements in Curry-Combs, of which the following is a specification embodying my said invention.

To enable others skilled in the art to make and use my invention, I herewith submit the following general description:

In my Patent for improvement in curry-combs dated December 27, 1864, and reissued, No. 1,854, January 24, 1865, I set forth in the specification of said reissue the following description of two several modifications, viz: "Two metallic handles, substantially as herein described, may be attached to the top of the comb, diagonally across the corners, or across the ends, at right angles with the teeth, and which slight variation of position might suit the fancy of some grooms as well as, if not better than, when placed on a line parallel with the teeth." But as I had failed to show such modifications in either the drawings or models of said original patent, it was subsequently adjudged as "new matter," and the said reissue accordingly was held as a nullity, and a reissue, February 8, 1876, made necessary to secure the invention as shown and described in the specification and drawings of my said original patent of December 27, 1864.

My present invention, therefore, embraces one of the two modifications as above described in the said reissue of January 24, 1865, of my said patent of December 27, 1864, and consists in the arrangement of two metallic handles or braces secured to the comb, as hereinbefore described.

Figure 1:
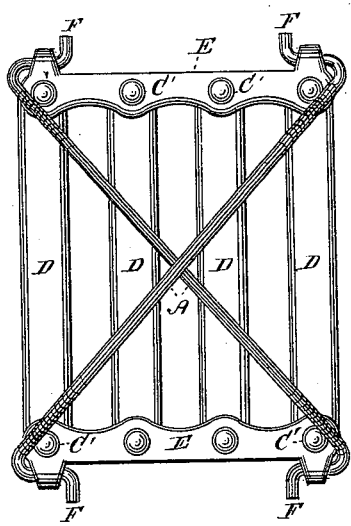
Figure 2:
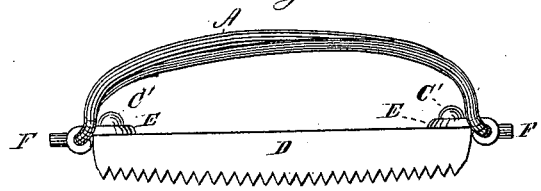

In the drawings, Figure 1 is a plan or top view, and Fig. 2 a side elevation, of a complete comb on the plan of my invention, wherein the braces A are secured to the comb diagonally across the corners. These braces A may be made of wire, bent into requisite form, and secured to the comb in any suitable manner that will rigidly hold them in position; or they may be stamped out of sheet metal, or cast of metal, and united at their points of contact as of one continuous piece, and thereby admit of producing a variety of fancy designs. The side bars E and teeth-bars D are of the kind commonly used, and put together in the usual way.

I claim—

A curry-comb provided with a grasping device, consisting of two metallic handles or braces, extending diagonally over the top of the comb, whereby to brace the latter, and affording additional grasp and support for the hand.

CYRUS W. SALADEE.

Witnesses:
 EUGENE W. JOHNSON,
 JOS. B. LOOMIS.